(12) United States Patent
Tsuji et al.

(10) Patent No.: US 10,834,281 B2
(45) Date of Patent: Nov. 10, 2020

(54) DOCUMENT SIZE DETECTING BY MATCHING BETWEEN IMAGE OF ENTIRE DOCUMENT AND READ SIZE IMAGE

(71) Applicant: FUJI XEROX CO., LTD., Tokyo (JP)

(72) Inventors: Ryosuke Tsuji, Kanagawa (JP);
Kiyoshi Une, Kanagawa (JP);
Nagamasa Misu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 180 days.

(21) Appl. No.: 15/976,964

(22) Filed: May 11, 2018

(65) Prior Publication Data

US 2018/0343354 A1    Nov. 29, 2018

(30) Foreign Application Priority Data

May 26, 2017    (JP) .................................. 2017-104988
Jun. 26, 2017    (JP) .................................. 2017-124062

(51) Int. Cl.
*H04N 1/00* (2006.01)
*G06K 9/00* (2006.01)
(Continued)

(52) U.S. Cl.
CPC ....... *H04N 1/0066* (2013.01); *G06K 9/00442* (2013.01); *G06K 9/00463* (2013.01); *G06T 7/13* (2017.01); *G06T 7/33* (2017.01); *H04N 1/0044* (2013.01); *H04N 1/00708* (2013.01); *H04N 1/00771* (2013.01); *H04N 1/00806* (2013.01);
(Continued)

(58) Field of Classification Search
CPC ... H04N 1/0044–00461; H04N 1/0066; H04N 1/00702; H04N 1/00708; H04N 1/0071; H04N 1/00713; H04N 1/00721; H04N 1/00724; H04N 1/00726; H04N 1/00758; H04N 1/00771; H04N 1/00782; H04N 1/00801–00809; H04N 1/00811; H04N 1/00816; H04N 1/00824; H04N 1/04; H04N 1/10; H04N 1/3876; H04N 1/40062; H04N 1/6072; H04N 2201/0414; G06F 3/1256; G06K 9/00442; G06K 9/00456; G06K 9/00463; G06T 7/13; G06T 7/30; G06T 7/33
See application file for complete search history.

(56) References Cited

U.S. PATENT DOCUMENTS 6,859,287 B1 * 2/2005 Frederiksen ......... G03G 15/605
358/1.12
6,965,461 B1 * 11/2005 Chiang .............. H04N 1/00352
358/474

(Continued)

FOREIGN PATENT DOCUMENTS

JP    H10-229487 A    8/1998

*Primary Examiner* — Scott A Rogers
(74) *Attorney, Agent, or Firm* — Oliff PLC

(57) ABSTRACT

A document size detecting apparatus includes a first acquisition unit, a second acquisition unit, and a detector. The first acquisition unit acquires a first image that is an image of an entire document as a reading target. The second acquisition unit acquires a second image that is an image of a part of the document read by a first reading apparatus. The detector detects a size of the document using a result of a matching process between the first image and the second image and a read size that is a size of the second image read by the first reading apparatus.

19 Claims, 15 Drawing Sheets

(51) Int. Cl.
  *H04N 1/40*    (2006.01)
  *H04N 1/387*   (2006.01)
  *G06T 7/33*    (2017.01)
  *H04N 1/60*    (2006.01)
  *G06T 7/13*    (2017.01)

(52) U.S. Cl.
  CPC ..... *H04N 1/00809* (2013.01); *H04N 1/00811* (2013.01); *H04N 1/00816* (2013.01); *H04N 1/00824* (2013.01); *H04N 1/3876* (2013.01); *H04N 1/40062* (2013.01); *H04N 1/6072* (2013.01); *H04N 2201/043* (2013.01); *H04N 2201/0414* (2013.01); *H04N 2201/0416* (2013.01)

(56) References Cited

U.S. PATENT DOCUMENTS

| | | | | |
|---|---|---|---|---|
| 8,390,831 B2 * | 3/2013 | Nozaki | H04N 1/00482 | 358/1.13 |
| 8,861,042 B2 * | 10/2014 | Ishida | H04N 1/3872 | 358/474 |
| 9,794,478 B2 * | 10/2017 | Matsumoto | H04N 5/23222 | |
| 2002/0141646 A1 * | 10/2002 | Mushano | H04N 1/387 | 382/199 |
| 2016/0021270 A1 * | 1/2016 | Misaka | H04N 1/00692 | 358/461 |
| 2016/0057294 A1 * | 2/2016 | Kobayashi | H04N 1/0071 | 358/449 |
| 2016/0309049 A1 * | 10/2016 | Tagami | H04N 1/00816 | |
| 2018/0367688 A1 * | 12/2018 | Yellapragada | H04N 1/00713 | |
| 2018/0367689 A1 * | 12/2018 | Yellapragada | G06K 9/3258 | |
| 2020/0137233 A1 * | 4/2020 | Wilson | H04N 1/047 | |
| 2020/0162630 A1 * | 5/2020 | Arifuku | H04N 1/00013 | |

\* cited by examiner

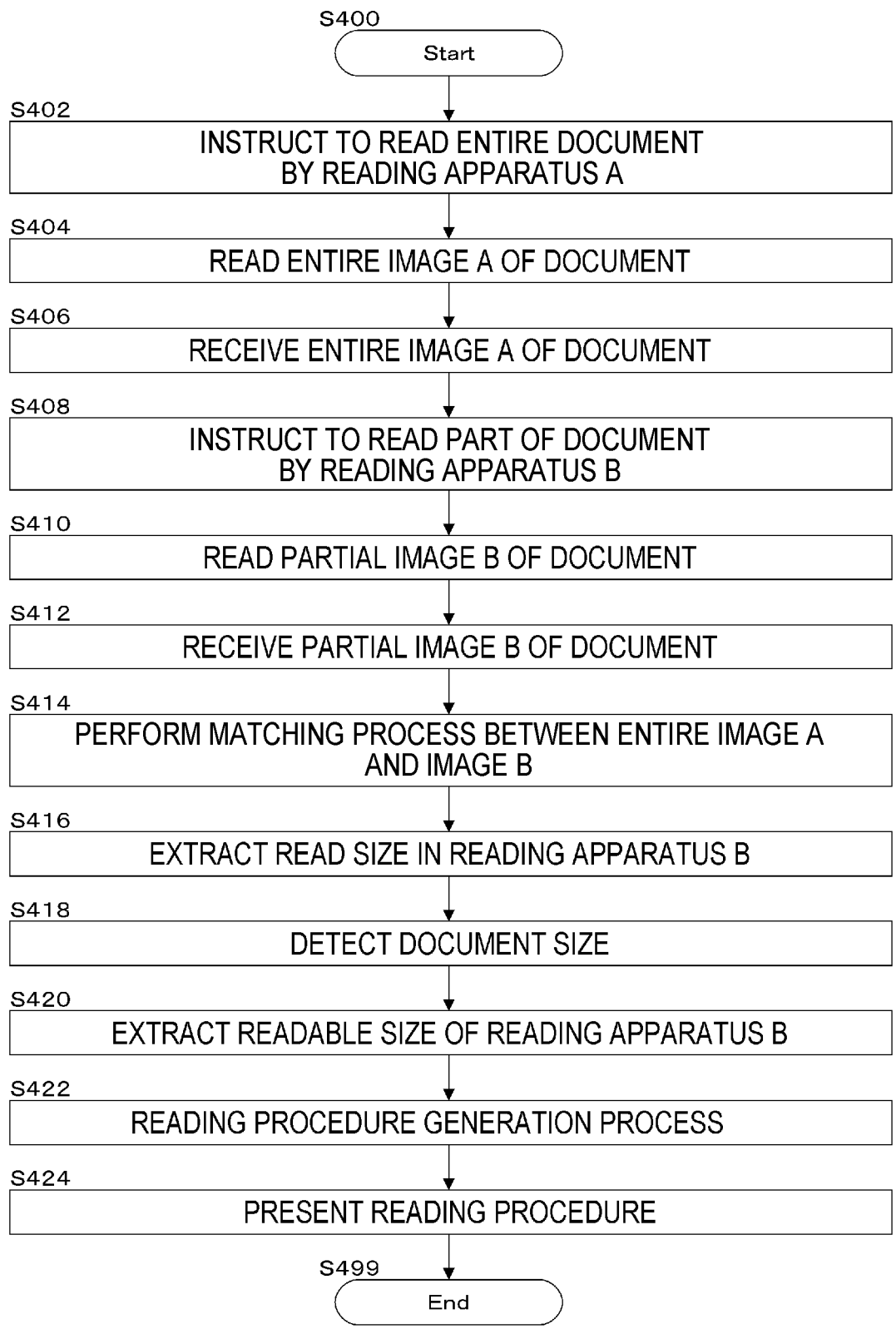

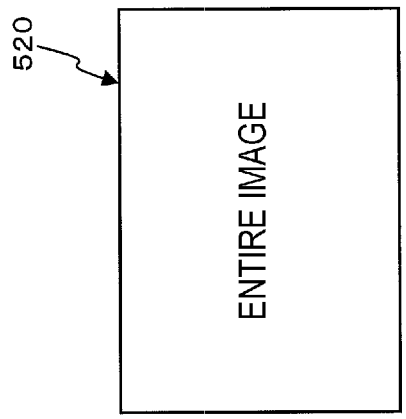
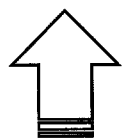
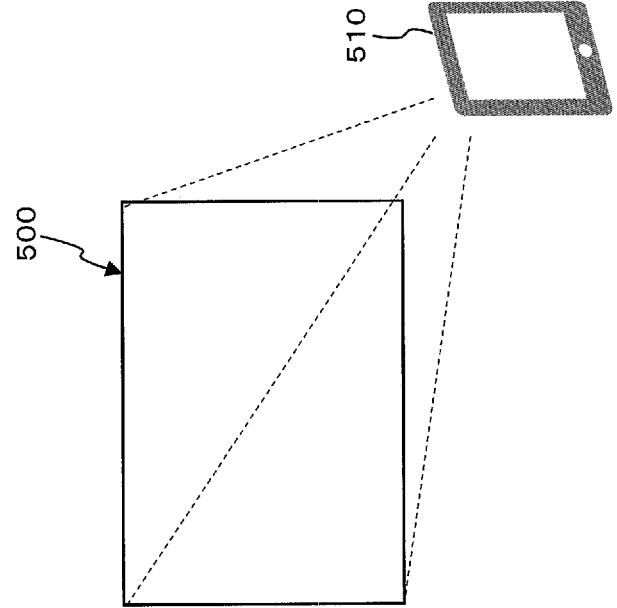
FIG.5A
FIG.5B

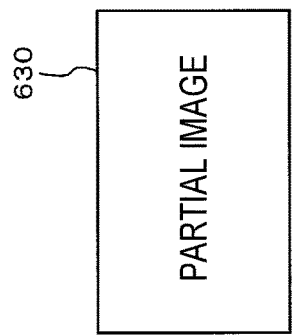
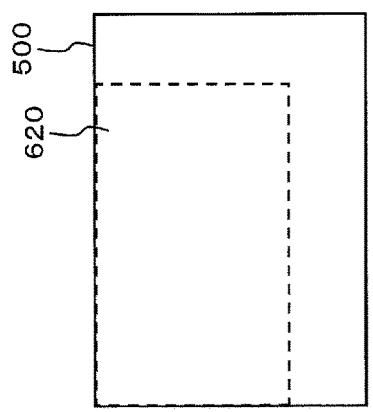
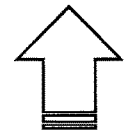
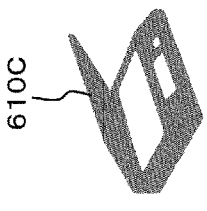
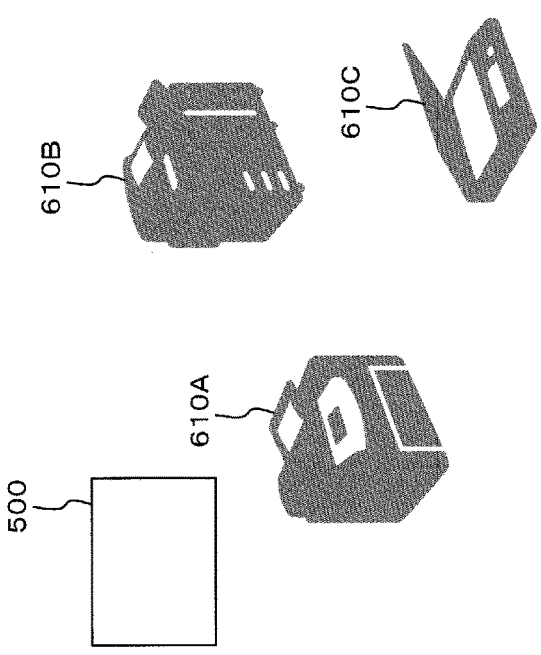

FIG.7A
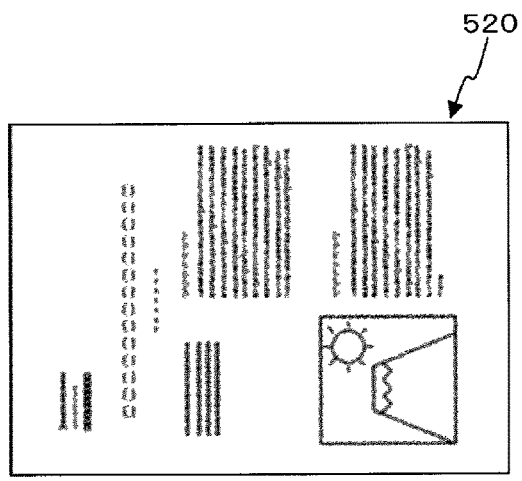
FIG.7B
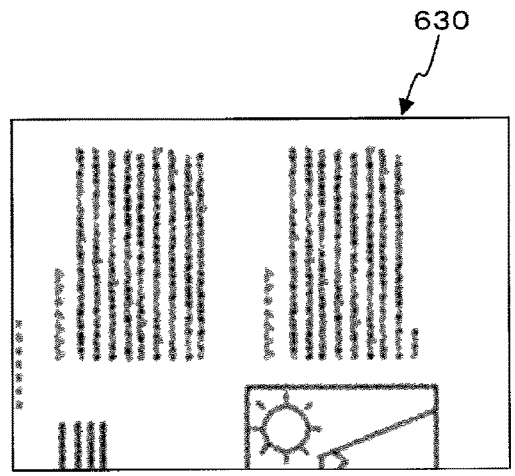
FIG.8
| WIDTH | HEIGHT |
|---|---|
| 2016[pix] | 1472[pix] |
FIG.9
| WIDTH | HEIGHT |
|---|---|
| 3300[pix] | 2550[pix] |

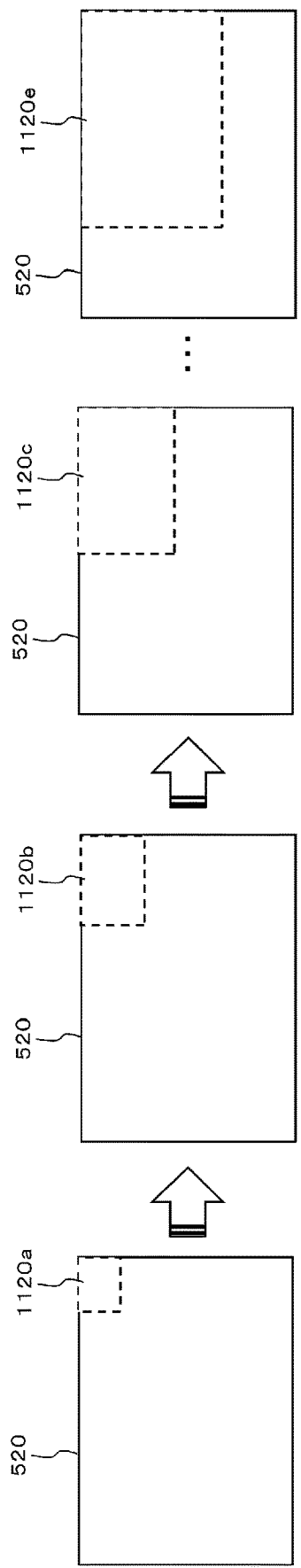

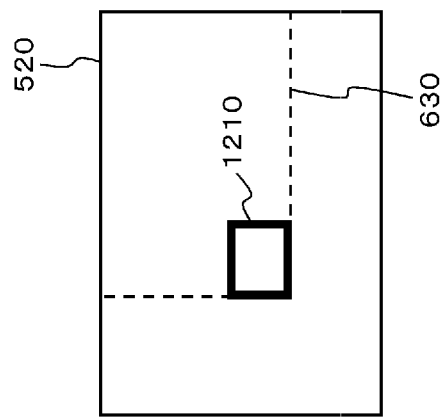
FIG.12C
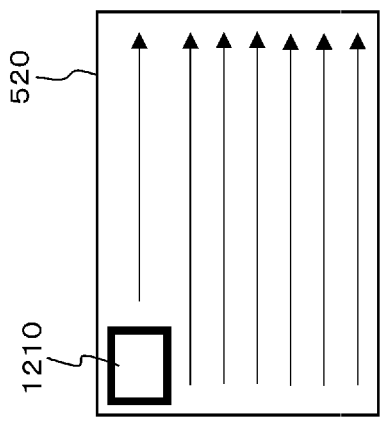
FIG.12B
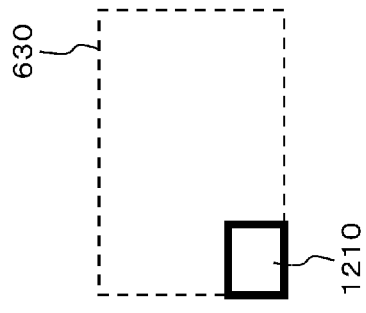
FIG.12A

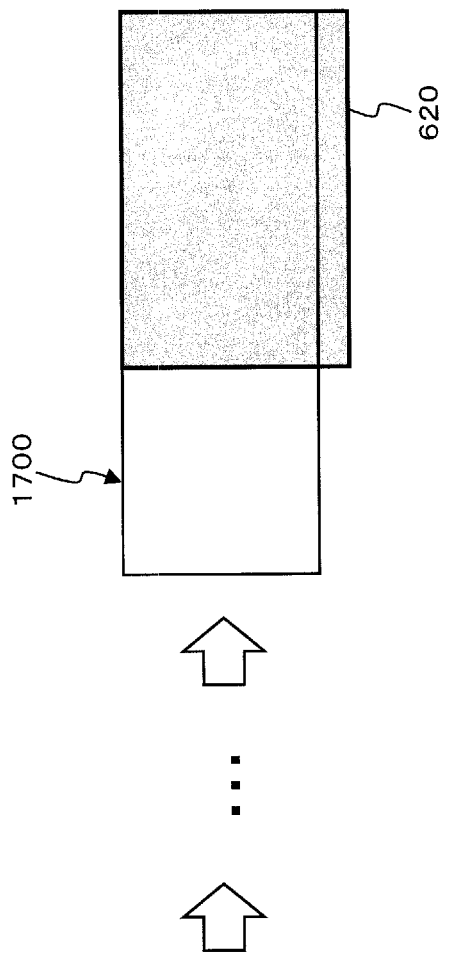
FIG.17A
FIG.17B
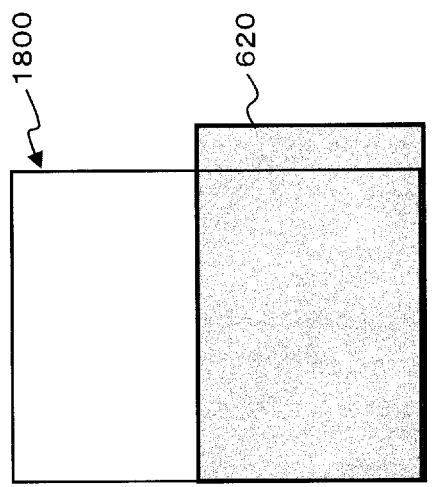
FIG.18A
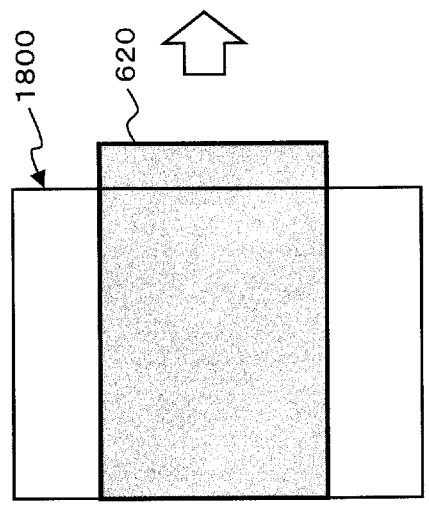
FIG.18B
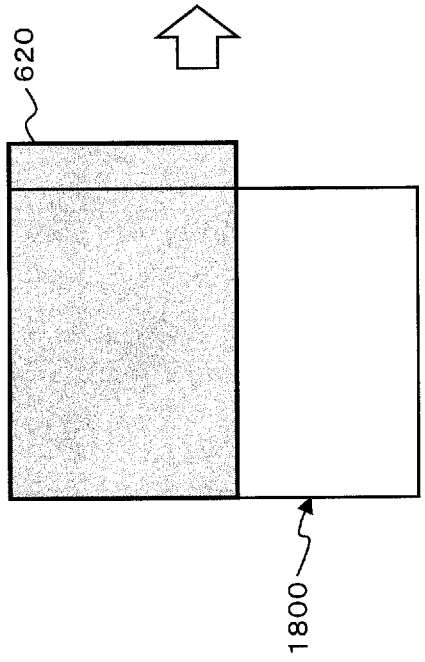
FIG.18C

DOCUMENT SIZE DETECTING BY MATCHING BETWEEN IMAGE OF ENTIRE DOCUMENT AND READ SIZE IMAGE

CROSS-REFERENCE TO RELATED APPLICATIONS

This application is based on and claims priority under 35 USC 119 from Japanese Patent Application Nos. 2017-104988 filed May 26, 2017 and 2017-124062 filed Jun. 26, 2017.

BACKGROUND

Technical Field

The present invention relates to a document size detecting apparatus, a non-transitory computer readable storage medium, and an image processing system.

SUMMARY

According to an aspect of the invention, a document size detecting apparatus includes a first acquisition unit, a second acquisition unit, and a detector. The first acquisition unit acquires a first image that is an image of an entire document as a reading target. The second acquisition unit acquires a second image that is an image of a part of the document read by a first reading apparatus. The detector detects a size of the document using a result of a matching process between the first image and the second image and a read size that is a size of the second image read by the first reading apparatus.

BRIEF DESCRIPTION OF THE DRAWINGS

Exemplary embodiments of the present invention will be described in detail based on the following figures, wherein:

FIG. 4 is a flow chart illustrating a process example according to the exemplary embodiment;

FIGS. 5A and 5B are explanatory views illustrating a process example according to the exemplary embodiment;

FIGS. 6A to 6C are explanatory views illustrating a process example according to the exemplary embodiment;

FIGS. 7A and 7B are explanatory views illustrating a process example according to the exemplary embodiment;

FIG. 8 is an explanatory view illustrating a data structure example of a camera image size table;

FIG. 9 is an explanatory view illustrating a data structure example of a scan image size table;

FIGS. 11A to 11D is an explanatory view illustrating a process example according to the exemplary embodiment;

FIGS. 12A to 12C are explanatory views illustrating a process example according to the exemplary embodiment;

FIGS. 17A and 17B are explanatory views illustrating a process example according to the exemplary embodiment;

FIGS. 18A to 18C are explanatory views illustrating a process example according to the exemplary embodiment;

DETAILED DESCRIPTION

Hereinafter, an exemplary embodiment suitable for implementing the present invention will be described with reference to the drawings.

Figure 1:
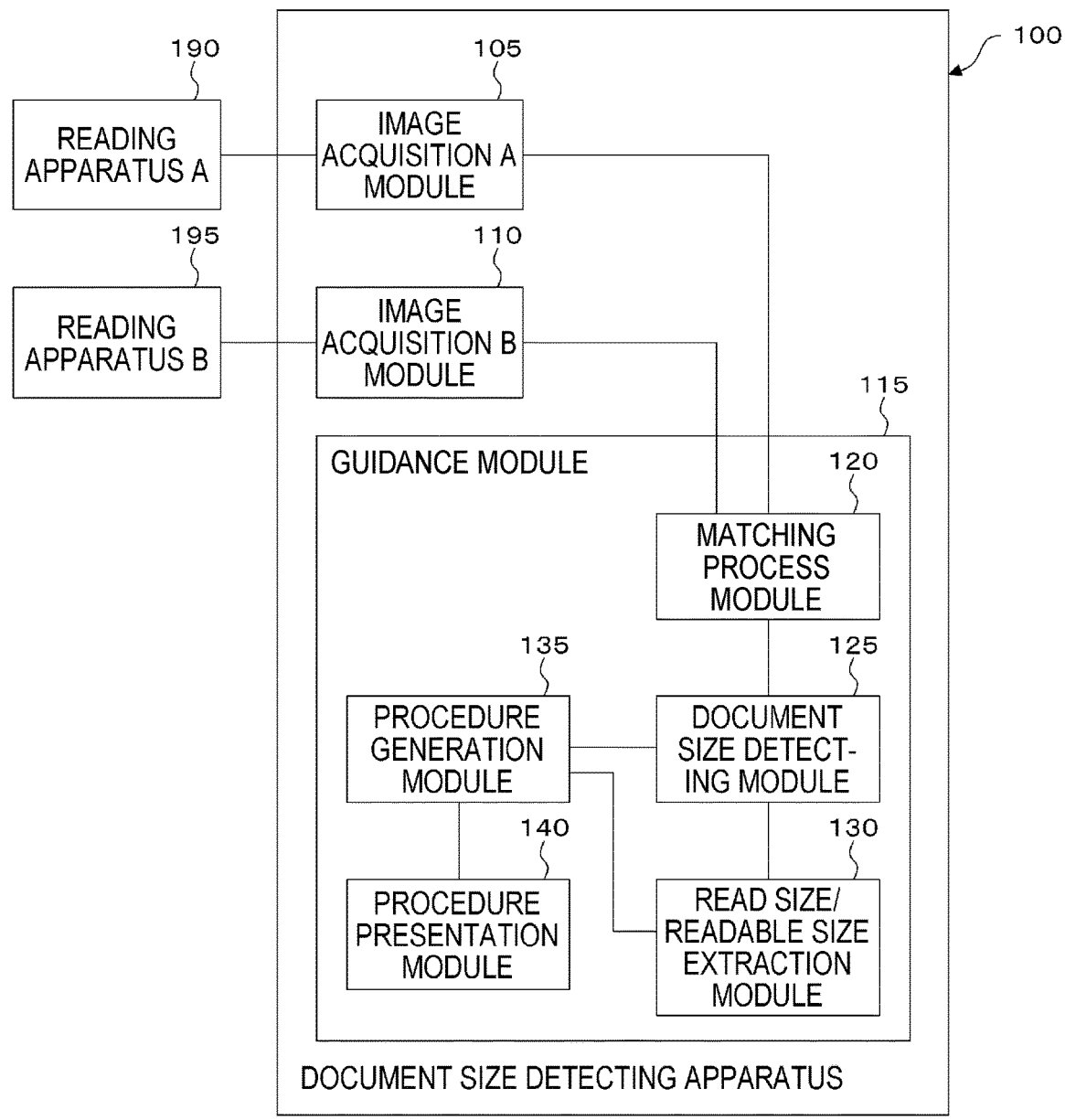
FIG. 1 is a conceptual module configuration diagram concerning a configuration example according to an exemplary embodiment.

FIG. 1 illustrates a conceptual module configuration diagram concerning a configuration example of the exemplary embodiment.

A module generally refers to a logically separable component such as software (a computer program) or hardware. Accordingly, the module in the exemplary embodiment refers to not only a module in the computer program, but also a module in a hardware configuration. Therefore, the exemplary embodiment also describes a computer program (a program causing a computer to execute respective procedures, a program causing a computer to function as respective units, and a program causing a computer to implement respective functions), a system and a method, which may serve as the modules. Meanwhile, for the convenience of explanation, "to store", "to be stored" and equivalent wordings are used. When the exemplary embodiment relates to a computer program, these wordings mean that the computer program is stored or controlled to be stored in a storage device. The modules may correspond to functions in a one-to-one relationship. Meanwhile, in implementation, one module may be constituted by one program, plural modules may be constituted by one program, and conversely, one module may be constituted by plural programs. The plural modules may be executed by one computer, or one module may be executed by plural computers in a distributed or parallel environment. One module may include another module. Hereinafter, a term "connection" is used for a case of not only a physical connection, but also a logical connection (a data exchange, an instruction, a reference relationship between data and the like). The term "predetermined" indicates that things are determined prior to a target process, and is used with the meaning that things are determined in accordance with a situation/state at that time or a situation/state until then as long as a target process is not yet performed before a process according to the exemplary embodiment starts or even after the process according to the exemplary embodiment starts. When there are plural "predetermined values," the values may be different from each other, or two or more values (of course, including all the values) may be the same as each other. In addition, the description "when it is A, B is performed" indicates that "it is determined whether it is A, and if it is determined that it is A, B is performed," except for a case where it is unnecessary to make the determination as to whether it is A. Enumeration of things such as "A, B, and C" indicates exemplary enumeration unless otherwise mentioned, which includes a case where only one (e.g., only A) is selected.

A configuration of a system or an apparatus may be implemented not only through connection between plural computers, hardware, apparatuses, and the like via a communication unit such as a network (including a one-to-one correspondence communication connection), but also through one computer, one hardware, one apparatus, and the like. An "apparatus" and a "system" are used synonymously with each other. Of course, the "system" does not include a system that is merely a social "structure" (a social system) as an artificial arrangement.

For each process by each module or for each of plural processes in a case where the plural processes are performed in a module, target information is read from a storage device, and a process result is written in the storage device after the process is performed. Accordingly, descriptions for reading from a storage device prior a process, and writing to the storage device after the process may be omitted. In addition, a storage device herein may include a hard disk, a random access memory (RAM), an external storage medium, a storage device via a communication line, a register within a central processing unit (CPU), and the like.

A document size detecting apparatus 100 according to the exemplary embodiment detects a size of a document. As illustrated in the example of FIG. 1, the document size detecting apparatus 100 includes an image acquisition A module 105, an image acquisition B module 110, and a guidance module 115. When a guidance of a reading method is unnecessary, a read size/readable size extraction module 130, a procedure generation module 135, and a procedure presentation module 140 within the guidance module 115 may be unnecessary.

Further, the read size/readable size extraction module 130, the procedure generation module 135, and the procedure presentation module 140 may be provided in the guidance module 115. With this configuration, the document size detecting apparatus 100 may present guidance for causing a reading apparatus to read a document image having a size larger than an area readable by the reading apparatus in plural batches.

There has been known a method of reading a document image using a reading apparatus. However, in a general reading apparatus, the size of an area readable at a time is limited. Depending on the size of a document as a reading target, the document size may be larger than the size of the area readable by the reading apparatus (hereinafter, referred to as a "readable size"). In such a case, in order to read the entire document image, it is required to read a document by the reading apparatus in plural batches.

Therefore, as a method of reading a document in plural batches, there has been known a method of determining a reading procedure according to a document size and a readable size and displaying a guidance (for example, a position where a document is to be placed, the number of times, and the like) corresponding to the reading procedure for an operator such that a read result of the entire document image is obtained through plural readings.

However, in order to take the document size into consideration as described above, it is required for the operator to specify the document size. Therefore, the operator may need to measure a size of a document.

The document size detecting apparatus 100 (the document size detecting apparatus 100 including the read size/readable size extraction module 130, the procedure generation module 135, and the procedure presentation module 140 in the guidance module 115) causes a reading apparatus to read a document image having a size larger than an area readable by the reading apparatus in plural batches and may generate a synthesized image obtained by synthesizing the read images without an operator specifying a document size.

Here, a "document having a size larger than an area readable by a reading apparatus" corresponds to, for example, an A3 size document in the case where a reading size of a scanner is an A4 size. In such a case, it is impossible to acquire an image of the entire document through one reading (also called scanning), and thus plural readings are required. Then, the read images are synthesized and the image with an original size (an A3 size in the above described example) is generated. For this synthesis process, a reading procedure may vary according to a feature amount in a document image. The document size detecting apparatus 100 presents the reading procedure.

Hereinafter, in describing the exemplary embodiment, terms will be defined.

A "size" refers to a combination of a length of a long side and a length of a short side when a rectangularization process is performed on a document or a readable area (when an area itself before subjected the rectangularization process is rectangular, the rectangularization process may not be necessary). The "size" is not determined only by a length of either a long side or a short side or an area of a rectangle. A statement that "a size A is larger than a size B" indicates that both a length of a long side and a length of a short side in the size A are larger than those in the size B. For example, there are an A3 size, an A4 size, a B4 size, a B5 size, and the like defined by International Standards, the Japanese Industrial Standards, or the like.

A "readable size" refers to a size of a readable area. Specifically, the readable size is a maximum size readable by a reading apparatus B 195 which will be described later.

A "read image" refers to an image obtained through one reading.

A "read size" refers to a size of a read image. Specifically, the read size is a size of a document read by the reading apparatus B 195 which will be described later. The read size may be the same as a readable size.

A "synthesized image" refers to an image obtained by synthesizing read images.

A "feature amount (of an image)" refers to an amount indicating a feature in an image, and indicates, for example, physical quantities of color parameters (such as brightness, saturation, and hue), a degree of change in each physical quantity or the like. More specifically, the feature amount may include an edge amount (an amount of portions where a brightness or the like of an image is discontinuously converted), a histogram (a distribution of a density value), a character recognition result (including a character code, information indicating whether or not a character is recognizable (e.g., a value indicating an accuracy of the character recognition result) and the like), or a combination thereof. In general, from the results obtained by analyzing these, it is possible to grasp various characteristics of an image such as a character or a photograph, an edge portion, and a blank portion.

A reading apparatus A 190 is connected to the image acquisition A module 105 of the document size detecting apparatus 100. The reading apparatus A 190 reads an image of the entire area in a document (the entire document) as a reading target. Unlike the reading apparatus B 195, the reading apparatus A 190 has a lower reading accuracy than that of the reading apparatus B 195. The reading apparatus A 190 may be, for example, a portable digital camera, a portable information device including a digital camera (including a cellular phone, a smart phone, a mobile device, a wearable computer or the like), or the like. Accordingly, when a document is read by the reading apparatus A 190, a distortion or the like may often occur compared to that in the reading apparatus B 195. The image read by the reading apparatus A 190 is an image as a pre-scan, but not an image used for finally performing a synthesis.

The reading apparatus B 195 is connected to the image acquisition B module 110 of the document size detecting apparatus 100. The reading apparatus B 195 reads at least a partial area in a document. The reading apparatus B 195 may correspond to, for example, a scanner, a multifunction machine having a function of a scanner (an image processing apparatus having functions of a printer, a copier, a facsimile, and the like in addition to the scanner function), or the like. A readable size that is a size of an area readable by the reading apparatus B 195 is fixed. This is because a reading surface on which a document is placed (generally, called a document table, a document glass or the like) is fixed. An image read by the reading apparatus B 195 is an image used for finally performing a synthesis.

The size of an image read by the reading apparatus B 195 may be a readable size, or may be smaller than the readable size. For example, this is because when the readable size of the reading apparatus B 195 is an A4 size, even a size smaller than the A4 size (e.g., a B5 size or an A5 size) may be read. In this case (where plural types of read sizes are present), a read size is determined by operation of an operator in the case where the document is read. Of course, if there is only one type of read size, the readable size becomes the read size.

The image acquisition A module 105 is connected to a matching process module 120 of the guidance module 115 and the reading apparatus A 190. The image acquisition A module 105 acquires a first image that is an image of the entire document as a reading target, from the reading apparatus A 190. "The image of the entire document" is captured as an image to be received. An image other than a document (an image serving as a background, other than a document area) may be captured if the document can be extracted from the image. If an image other than the document is included or if an inclined document is captured, the inclination or the distortion may be corrected using a related technology, and a process of transforming (including clipping) the document into a rectangular image may be performed to generate an image of only the document.

The image acquisition B module 110 is connected to the matching process module 120 of the guidance module 115, and the reading apparatus B 195. The image acquisition B module 110 acquires a second image (an image of a part of a document) read by the reading apparatus B 195. Here, a document as a reading target is the same as the document captured by the reading apparatus A 190. The size of the image acquired from the reading apparatus B 195 is a size readable by the reading apparatus B 195 or a size smaller than the readable size. The document as a reading target is larger than the readable size of the reading apparatus B 195. Accordingly, plural readings become necessary in the reading apparatus B 195. The document may have a size adapted to a standard (for example, the JIS standard or the like), or an irregular (non-standard) size.

The guidance module 115 includes the matching process module 120, a document size detecting module 125, the read size/readable size extraction module 130, the procedure generation module 135, and the procedure presentation module 140.

The matching process module 120 is connected to the image acquisition A module 105, the image acquisition B module 110, and the document size detecting module 125.

The matching process module 120 performs a matching process between the first image acquired by the image acquisition A module 105 and the second image acquired by the image acquisition B module 110. As the matching process, a related matching process may be used. The first image includes an image of the entire document, and the second image is an image of a part of the document. Accordingly, as a result of the matching process, a ratio (a proportion) of the second image occupying the document image in the first image may be detected.

The document size detecting module 125 is connected to the matching process module 120, the read size/readable size extraction module 130, and the procedure generation module 135. The document size detecting module 125 calculates a ratio of an area occupied by an image corresponding to the second image in the first image from the result of the matching process between the first image acquired by the image acquisition A module 105 and the second image acquired by the image acquisition B module 110 (the processing result by the matching process module 120). As the ratio, at least one of a width ratio, a height ratio, or an area ratio may be used. Particularly, when the document is found to be adapted to a standard, short sides or long sides may match each other so that either the width ratio or the height ratio may be employed.

Then, the document size detecting module 125 detects the size of the document using a ratio and a read size. That is, the document size detecting module 125 detects the size of the document as a target using the processing result by the matching process module 120 and the read size that is the size of the second image read by the reading apparatus B 195. "The read size that is the size of the second image read by the reading apparatus B 195" is received from the read size/readable size extraction module 130. Specifically, the document size detecting module 125 may calculate a width ratio and a height ratio of the area occupied by the image corresponding to the second image in the first image from the result of the matching process. Then, the document size detecting module 125 may detect a width and a height of the document using the width ratio, the height ratio, and the read size.

The read size/readable size extraction module 130 is connected to the document size detecting module 125 and the procedure generation module 135. The read size/readable size extraction module 130 extracts the read size of a target document in the reading apparatus B 195. Then, the read size/readable size extraction module 130 extracts a readable size that is the size of an area readable by the reading apparatus B 195. For example, the read size/readable size extraction module 130 may communicate with the reading apparatus B 195, and acquire the read size in the reading apparatus B 195 and the readable size in the reading apparatus B 195 through an inquiry. When the read size is embedded within the second image, the read size may be extracted. For example, exchangeable image file format (Exif) information may be used. A reading apparatus/readable size correspondence table 1600 illustrated in the example of FIG. 16 may be used to extract the readable size of the reading apparatus B 195.

The procedure generation module 135 is connected to the document size detecting module 125, the read size/readable size extraction module 130, and the procedure presentation module 140. The procedure generation module 135 generates a reading procedure when a target document is read by the reading apparatus B 195 in plural batches, using a document size and a read size.

The reading procedure may include one or more of following items.

(1) at the time of each reading, an instruction as to which area on each document is to be read by the reading apparatus B 195;
(2) at the time of each reading, an instruction as to at which position or in which orientation each document is to be placed on the reading apparatus B 195;
(3) an instruction on the number of times a document is to be read; and
(4) after reading at least once or more, an instruction as to whether further reading is required.

For example, the procedure generation module 135 may determine a reading procedure according to the document size and the readable size of the reading apparatus B 195. Here, the use of the readable size is to use the maximum read size of the reading apparatus B 195, thereby reducing the number of times of reading. Accordingly, the read size in the case where an image as a synthesis target is read plural times may be set as the readable size. For example, the read size may not be selected by the operator, but may be fixed to the readable size.

Specifically, the procedure generation module 135 may determine a reading procedure such that the width or the height of the readable size is longer than or equal to or longer than the width or the height of the document size.

The procedure generation module 135 may determine a reading procedure such that when an adjacent area is read, an area of a document may be read together.

The procedure generation module 135 may generate a reading procedure that provides guidance as to which area of the document is to be read at each reading such that an area in which a feature amount is locally largely changed on a document is included in a reading area at the time of reading at least twice.

In such a case, the procedure generation module 135 may select reading patterns in which areas where a feature amount is locally largely changed overlap, among plural reading patterns in which reading areas overlap each other, for each document size. The reading pattern is a predetermined reading procedure, and the reading procedure is determined by selecting the reading pattern.

In the case of the reading patterns, each reading pattern may specify (i) which area of the document is an area to be read plural times and (ii) which area is an area to be read once.

The procedure generation module 135 may change the number of times of reading according to a position of an area in which a feature amount is locally largely changed.

The procedure generation module 135 may generate a reading procedure such that when there are plural areas in which a feature amount is locally largely changed in a document, the plural areas are included in an overlapping area.

The procedure generation module 135 may generate a reading procedure that provides a guidance as to which area of the document is to be read at each reading such that an area in which a feature amount is locally minutely changed on a document is not included in a reading area at the time of reading at least twice.

The procedure generation module 135 may generate a reading procedure that provides a guidance as to which area of the document is to be read at each reading such that reading areas at the time of plural readings do not overlap each other in an area in which a feature amount is locally minutely changed, as a boundary in the document. Here, the statement "not overlapping each other" is synonymous with a reduction of an overlapping portion.

Then, when a document size is an integer multiple of a readable size, the procedure generation module 135 may specify an area that may become a joint, and may check if a feature amount is locally minutely changed around the area. Here, the "document size is an integer multiple of a readable size" indicates that a case where the area size is an integer multiple, which corresponds to the case where, for example, the document size is an A3 size, and the readable size is an A4 size.

Further, the procedure generation module 135 may check the joint area after reading is performed an integer number of times.

The procedure generation module 135 may generate a reading procedure that performs a guidance to end a reading in the case where a change is minute when the joint area is checked after reading.

The procedure generation module 135 may generate a reading procedure that performs a guidance to prompt the next time reading in the case where a change is large when the joint area is checked after reading.

The procedure generation module 135 may generate a reading procedure that performs a guidance such that the next time reading includes at least a part of an already read area, and an area including a portion with a local large change becomes a reading area in the part.

In the checking of these, a determination may be made based on an edge amount in a coupling direction, a histogram, a character recognition result, or a combination thereof. For example, when the edge amount is a predetermined threshold value or more, a corresponding area is determined as an area having a large feature amount change. For example, in the character recognition result, when the number of objects that are not recognizable as characters (for example, the number of objects that are not recognizable as characters in a case where only a part of characters become as targets of character recognition) is a predetermined threshold value or more, a corresponding area may be determined as an area having a large feature amount change. When the character recognition result is blank (a recognition result that there is no character), a corresponding area may be determined as an area having a minute feature amount change.

When a document size is not an integer multiple of a readable size, the procedure generation module 135 may generate a reading procedure that provides a guidance as to which area of the document is to be read at each reading such that an overlapping reading area at the time of plural readings becomes smaller. Here, the case where the "document size is not an integer multiple of a readable size" indicates the case where the area size is not an integer multiple, which corresponds to the case where, for example, the document size is a B4 size, and the readable size is an A4 size.

Then, the procedure generation module 135 may check if an area in which a feature amount is locally minutely changed is included in the overlapping reading area.

Further, the procedure generation module 135 may generate a reading procedure that performs a guidance to end a reading in the case where an area in which a feature amount is locally minutely changed is included after checking.

The procedure generation module 135 may generate a reading procedure that performs a guidance to prompt the next time reading in the case where an area in which a feature amount is locally minutely changed is not included after checking.

The procedure generation module 135 may generate a reading procedure that performs a guidance such that the next time reading includes at least a part of an already read area, and an area including a portion with a local large change becomes a reading area in the part.

In the checking of these, a determination may be made based on an edge amount in a coupling direction, a histogram, a character recognition result, or a combination thereof.

The procedure presentation module 140 is connected to the procedure generation module 135. The procedure presentation module 140 presents a reading procedure generated by the procedure generation module 135. Here, the presentation may include an output as a three-dimensional (3D) image as well as a display on a display device such as a liquid crystal display, and further include a combination of an output of a sound through a sound output device (such as a speaker), a vibration, and a printing by a printing device such as a printer, etc.

Figure 2A:
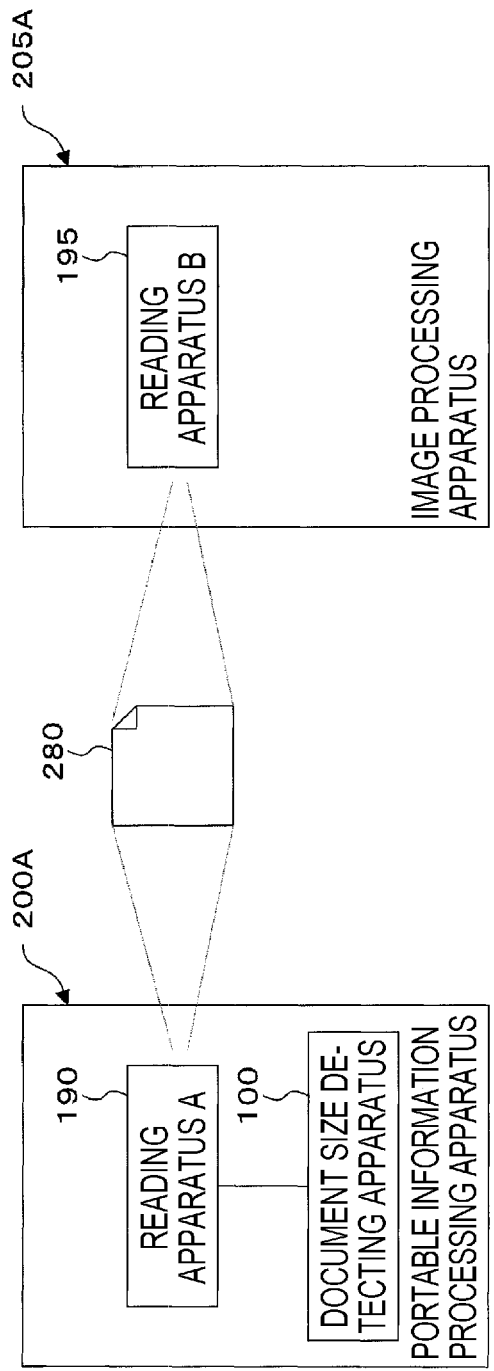
FIGS. 2A and 2B are explanatory views illustrating a system configuration example according to the exemplary embodiment.
Figure 2B:
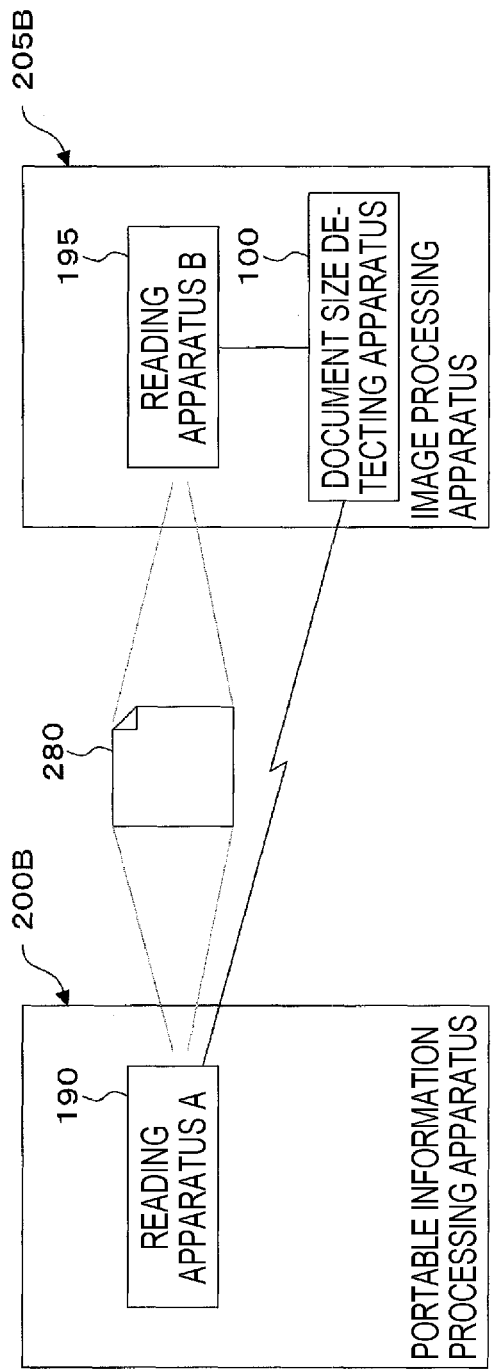

FIGS. 2A and 2B are explanatory views illustrating a system configuration example according to the exemplary embodiment. Particularly, in order to read a document 280 by an image processing apparatus 205, the document 280 is read (pre-scanned) in advance by a portable information processing apparatus 200A, and the size of the document 280 is detected, and a reading procedure in the image processing apparatus 205 is presented.

The example illustrated in FIG. 2A includes a configuration of a portable information processing apparatus 200A and an image processing apparatus 205A.

The portable information processing apparatus 200A includes the document size detecting apparatus 100 and the reading apparatus A 190. The document size detecting apparatus 100 is connected to the reading apparatus A 190. The image processing apparatus 205A includes the reading apparatus B 195.

The document 280 is read (pre-scanned) by the reading apparatus A 190 of the portable information processing apparatus 200A, the reading procedure is presented on a display of the portable information processing apparatus 200A, and the operator operates the image processing apparatus 205A while viewing the reading procedure so as to read the document 280.

The example illustrated in FIG. 2B includes a configuration of a portable information processing apparatus 200B and an image processing apparatus 205B.

The portable information processing apparatus 200B includes the reading apparatus A 190. The image processing apparatus 205B includes the document size detecting apparatus 100 and the reading apparatus B 195. The document size detecting apparatus 100 is connected to the reading apparatus B 195. The reading apparatus A 190 within a portable information processing apparatus 200B is connected to the document size detecting apparatus 100 within the image processing apparatus 205B through a communication line (which may be wired or wireless).

The document 280 is read (pre-scanned) by the reading apparatus A 190 of the portable information processing apparatus 200B, and the image is transmitted to the document size detecting apparatus 100 of the image processing apparatus 205B through a communication line. Then, the document size detecting apparatus 100 presents the reading procedure on a display of the image processing apparatus 205B, and the operator operates the image processing apparatus 205B while viewing the reading procedure so as to read the document 280.

Figure 3:
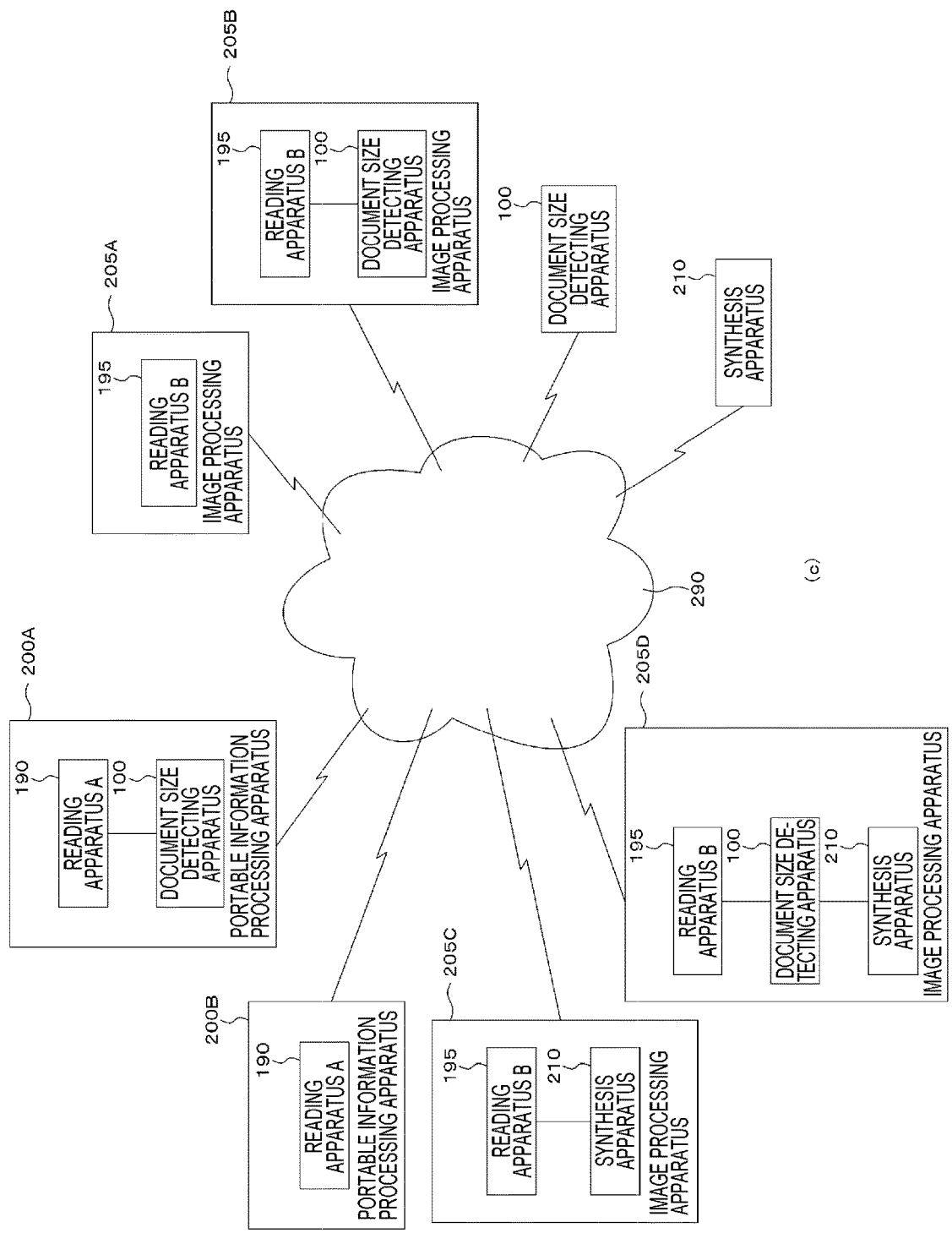
FIG. 3 is an explanatory view illustrating a system configuration example according to the exemplary embodiment.

FIG. 3 is an explanatory view illustrating a system configuration example according to the exemplary embodiment.

The document size detecting apparatus 100, the portable information processing apparatus 200A, the portable information processing apparatus 200B, the image processing apparatus 205A, the image processing apparatus 205B, the image processing apparatus 205C, the image processing apparatus 205D, and a synthesis apparatus 210 are connected to each other via a communication line 290. The communication line 290 may be wireless, wired or a combination of wireless and wired communication lines, and may be, for example, an intranet, the Internet as a communication infrastructure or the like. Functions executed by the document size detecting apparatus 100 and the synthesis apparatus 210 may be implemented as a cloud service. The portable information processing apparatus 200A includes the document size detecting apparatus 100 and the reading apparatus A 190. The portable information processing apparatus 200B includes the reading apparatus A 190. The image processing apparatus 205A includes the reading apparatus B 195. The image processing apparatus 205B includes the document size detecting apparatus 100 and the reading apparatus B 195. The image processing apparatus 205C includes the reading apparatus B 195, and the synthesis apparatus 210. The image processing apparatus 205D includes the document size detecting apparatus 100, the reading apparatus B 195, and the synthesis apparatus 210. The synthesis apparatus 210 synthesizes plural images read by the image processing apparatus 205, and may output the synthesized image. Examples of outputting an image may include printing with a printing device such as a printer, displaying on a display device such as a display, transmitting an image through an image transmission device such as a facsimile, writing an image to an image storage device such as an image database, storing in a storage medium such as a memory card, transferring to another information processing apparatus and the like.

As the synthesis process performed by the synthesis apparatus 210, there has been known, for example, a technique of analyzing respective plural images as synthesis targets to extract a feature amount in an overlapping area and connecting the plural images by aligning the plural images based on the extracted feature amount. In this image processing, if the feature amount in the overlapping area between the plural images is largely changed (for example, a so-called edge portion where a density difference is large), an alignment accuracy is high and the synthesis process is successful. To the contrary, if the feature amount in the overlapping area is minutely changed, the alignment accuracy is small and the synthesis process would fail.

Accordingly, the area to be read redundantly needs to include an area having a feature amount that is largely changed to such an extent that the area can be used in alignment for synthesis. The document size detecting apparatus 100 presents a reading procedure such that an area with a large feature amount change is included in the overlapping area.

For example, through a combination of the portable information processing apparatus 200A, the image processing apparatus 205A, and the synthesis apparatus 210, images which are read in plural batches may be synthesized.

For example, through a combination of the portable information processing apparatus 200B, the image processing apparatus 205B, and the synthesis apparatus 210, images which are read in plural batches may be synthesized.

For example, through a combination of the portable information processing apparatus 200B and the image processing apparatus 205D, images which are read in plural batches may be synthesized.

In the example illustrated in FIGS. 2A and 2B, the document size detecting apparatus 100 is included in the portable information processing apparatus 200A or the image processing apparatus 205B, but the document size detecting apparatus 100 may be configured alone. For example, the function of the document size detecting apparatus 100 may be provided as a cloud service, and the procedure presentation module 140 may present a reading procedure to the portable information processing apparatus 200 or the image processing apparatus 205 used by the operator who causes a document to be read.

For example, through a combination of the portable information processing apparatus 200B, the document size detecting apparatus 100, and the image processing apparatus 205C, images which are read in plural batches may be synthesized.

FIG. 4 is a flow chart illustrating a process example according to the exemplary embodiment.

In step S402, the procedure presentation module 140 instructs an operator to read an entire document by the reading apparatus A 190.

In step S404, the reading apparatus A 190 reads an entire image A of a document according to an operation of the operator.

In step S406, the image acquisition A module 105 receives the entire image A of the document from the reading apparatus A 190.

The process example from step S402 to step S406 will be described with reference to the example of FIGS. 5A and 5B.

A display device of a camera-equipped portable information processing apparatus 510 displays that the whole of a document 500 is captured.

As illustrated in the example of FIG. 5A, the operator operates the camera-equipped portable information processing apparatus 510 so as to capture the whole of the document 500.

Then, as illustrated in the example of FIG. 5B, the image acquisition A module 105 acquires an entire image 520 of the document 500 from the camera-equipped portable information processing apparatus 510.

In step S408, the procedure presentation module 140 instructs a part of the document to be read by the reading apparatus B 195.

In step S410, the reading apparatus B 195 reads a partial image B of the document according to an operation of the operator.

In step S412, the image acquisition B module 110 receives the partial image B of the document.

The process example from step S408 to step S412 will be described with reference to the example of FIGS. 6A to 6C.

A display device of an image processing apparatus 610 displays that a part of the document 500 is read.

As illustrated in the example of FIG. 6A, the operator operates the image processing apparatus 610 to read a part of the document 500.

As illustrated in the example of FIG. 6B, since the size of the document 500 is larger than the readable size of the image processing apparatus 610 (the size of a reading surface 620), a part of the document 500 is read. In the example of FIG. 6B, since the upper left corner of the document 500 (the upper left corner when viewed from the rear surface) is aligned with the upper left corner of the reading surface 620, the upper left portion of the document 500 is read. Here, the reading does not necessarily have to be based on the readable size of the image processing apparatus 610. Depending on the designation of the operator, the size may be smaller than the readable size of the image processing apparatus 610.

Then, as illustrated in the example of FIG. 6C, the image acquisition B module 110 acquires a partial image 630 of the document 500 from the image processing apparatus 610.

In step S414, the matching process module 120 performs a matching process between the entire image A and the image B.

For example, a matching process is performed between the entire image 520 illustrated in FIG. 7A and the partial image 630 illustrated in FIG. 7B. Here, for the size of the entire image 520, a camera image size table 800 is acquired, and for the size of the partial image 630, a scan image size table 900 is acquired. FIG. 8 is an explanatory view illustrating a data structure example of the camera image size table 800. The camera image size table 800 includes a width column 810 and a height column 820. The width column 810 stores the number of pixels of the width of the entire image 520. The height column 820 stores the number of pixels of the height of the entire image 520. FIG. 9 is an explanatory view illustrating a data structure example of the scan image size table 900. The scan image size table 900 includes a width column 910 and a height column 920. The width column 910 stores the number of pixels of the width of the partial image 630. The height column 920 stores the number of pixels of the height of the partial image 630.

Figure 10B:
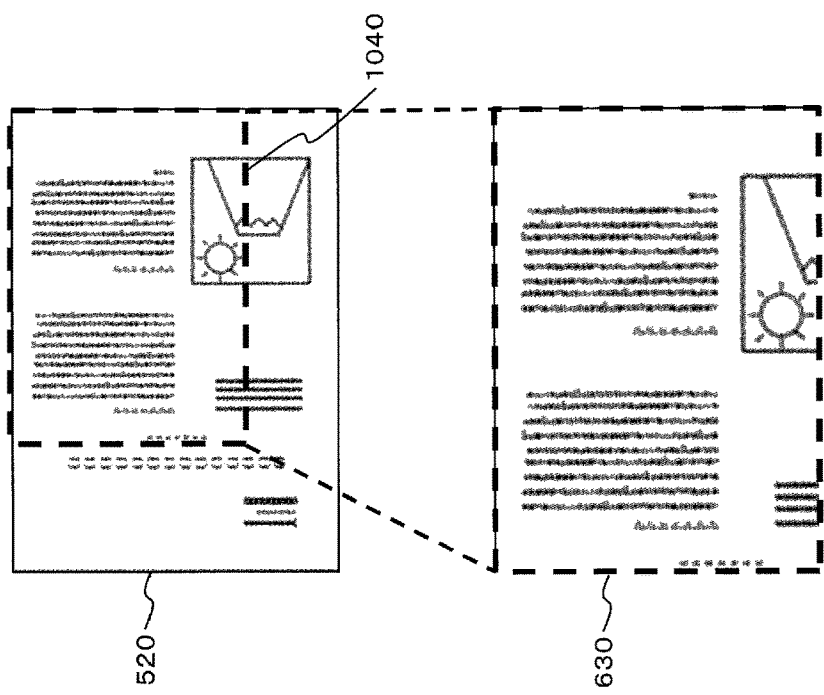
FIGS. 10A and 10B are explanatory views illustrating a process example according to the exemplary embodiment.
Figure 10A:
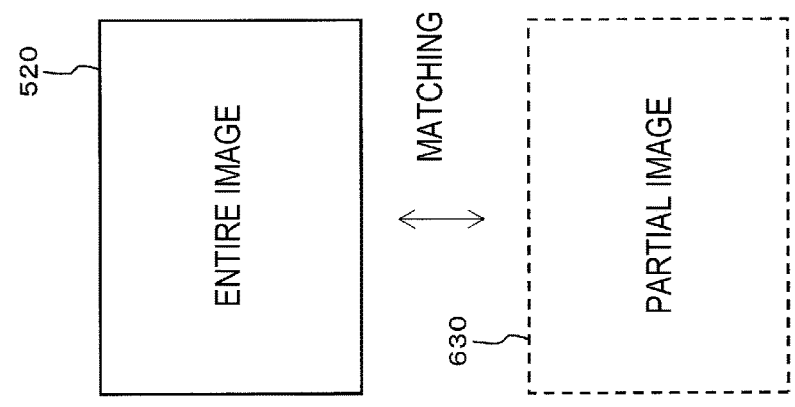

As illustrated in the example of FIG. 10A, a matching process is performed between the entire image 520 and the partial image 630. In a matching process, for example, a scale invariant feature transform (SIFT) technology capable of performing the matching process of an image regardless of a scale or a color tone may be used.

As illustrated in the example of FIG. 10B, the partial image 630 matches the upper right portion (a corresponding area 1040) of the entire image 520.

The matching process may be performed as follows.

FIG. 11 is an explanatory view illustrating a matching process example according to the exemplary embodiment. As illustrated in an example of FIG. 11A, a matching process is performed between a partial image 1120a at the upper right within the partial image 630 and an upper right area of the entire image 520. In general, reading is performed by aligning corners of a document and a reading surface with each other, and thus a matching process is performed in the corner areas. Then, in the case where the corners match each other, as illustrated in an example of FIG. 11B, a matching process is performed between a partial image 1120b (an area larger than the partial image 1120a) at the upper right within the partial image 630 and the upper right area of the entire image 520. This process is repeated as the partial image 1120 gradually increases (FIG. 11C, . . . FIG. 11D). When it is determined that the corners do not match each other, the same matching process may be performed at other corners.

FIGS. 12A to 12C are explanatory views illustrating a matching process example according to the exemplary embodiment. As illustrated in the example of FIG. 12A, a partial image 1210 within the partial image 630 is extracted. Then, as illustrated in the example of FIG. 12B, scanning is performed while a matching process of the partial image 1210 is performed within the entire image 520. Then, as illustrated in the example of FIG. 12C, at a portion matching the partial image 1210, within the entire image 520, a matching process is performed over the entire area of the partial image 630.

Figure 13:
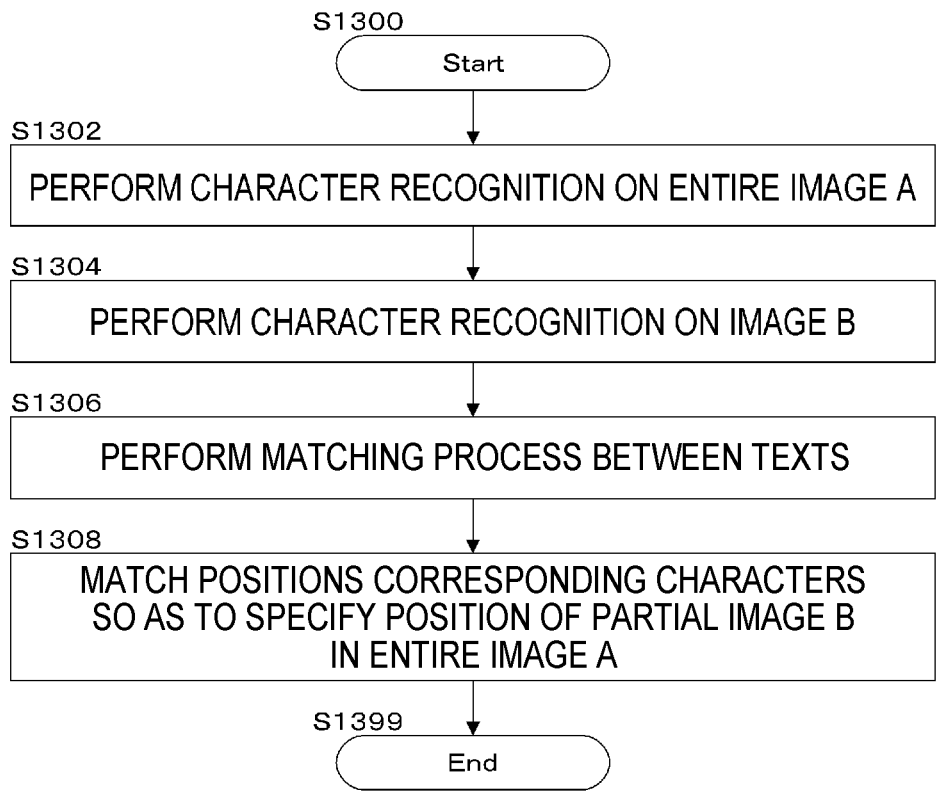
FIG. 13 is a flow chart illustrating a process example according to the exemplary embodiment.

FIG. 13 is a flow chart illustrating a matching process example according to the exemplary embodiment. Unlike a matching process of an image, an influence of a resolution on a character recognition result is small. Thus, this is useful for a matching process between the entire image 520 and the partial image 630 having different resolutions. Particularly, when an image is determined to be an image having many characters, a matching process illustrated in the example of FIG. 13 may be performed.

In step S1302, a character recognition is performed on the entire image A (the entire image 520). Here, in a character recognition process, as a character recognition result, a position of a target character image (a position in the entire image A) is output together with a recognition result (text) of the character image.

In step S1304, a character recognition is performed on the image B (the partial image 630). Here, in a character recognition process, as a character recognition result, a position of a target character image (a position in the entire image B) is output together with a recognition result (text) of the character image.

In step S1306, a matching process is performed between texts as both character recognition results. In the matching process between the texts, a character which is likely to be erroneously recognized in the character recognition (a predetermined character, specifically, I, 1, etc.) may not be set as a target of the matching process.

In step S1308, positions of corresponding characters are matched such that the position of the partial image B within the entire image A is specified.

In step S416, a read size in the reading apparatus B 195 is extracted. For example, a read size may be extracted from the image processing apparatus 610 through an inquiry communication.

In step S418, a document size is detected. The document size may be detected using the matching process result in step S414 and the read size extracted in step S416.

FIG. 14 and FIGS. 15A to 15C are explanatory views illustrating a process example according to the exemplary embodiment.

Figure 14:
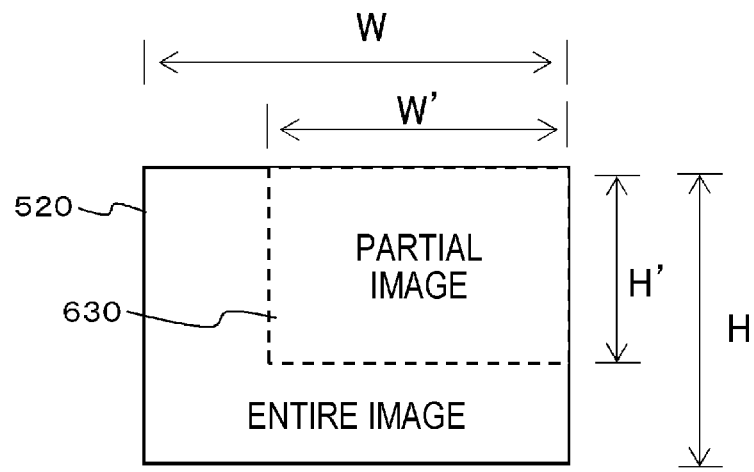
FIG. 14 is an explanatory view illustrating a process example according to the exemplary embodiment.

The example of FIG. 14 illustrates a relationship between the size of the entire image 520 and the size of the partial image 630. When the width and height of the entire image 520 are set to W and H, respectively, and the width and height of the partial image 630 are set to W' and H', respectively, the width ratio becomes "W:W'," and the height ratio becomes "H:H'." Then, the entire image 520 may be calculated using the size of the partial image 630 extracted in step S416 (the read size in the reading apparatus B 195).

Figure 15C:
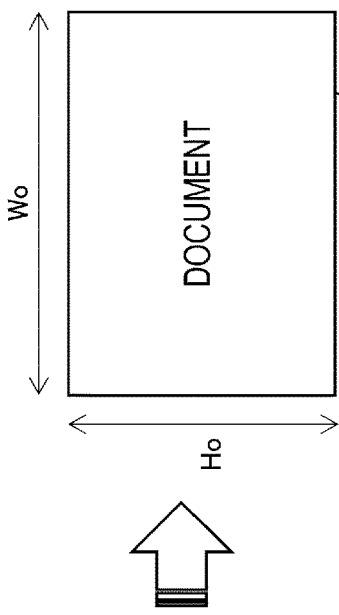
FIGS. 15A to 15C are explanatory views illustrating a process example according to the exemplary embodiment.
Figure 15B:
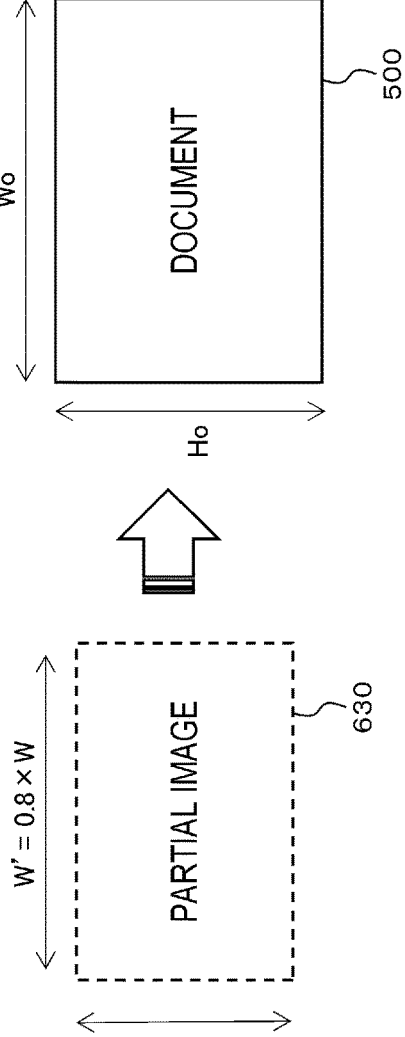
Figure 15A:
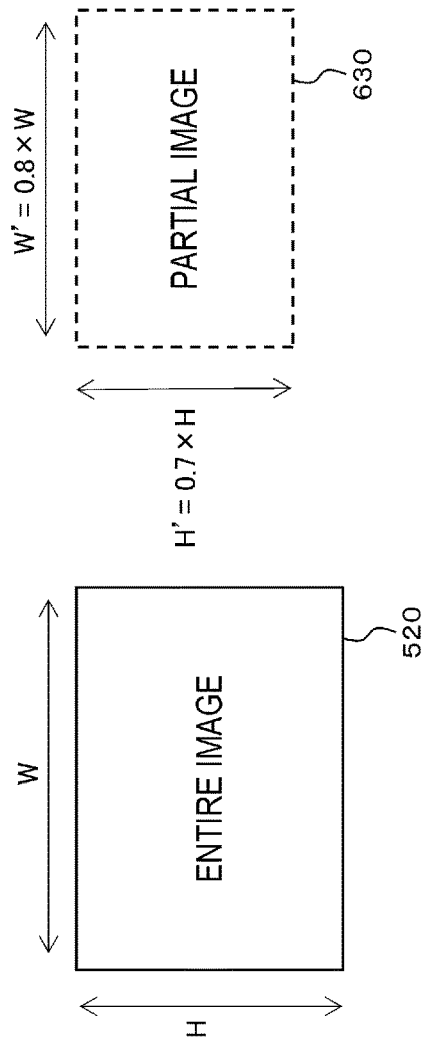

Specifically, as illustrated in the example of FIGS. 15A and 15B, when a width ratio and a height ratio satisfy that W'=0.8×W and H'=0.7×H, and the partial image 630 has an A4 size (width (W'): 297 mm, height (H'): 210 mm), the width (Wo) and the height (Ho) of the document 500 may be calculated as follows.

$$Wo = W' \times (1/0.8) = 297 \times (1/0.8) = 372 \text{ (mm)}$$

$$Ho = H' \times (1/0.7) = 210 \times (1/0.7) = 300 \text{ (mm)}$$

Figure 16:
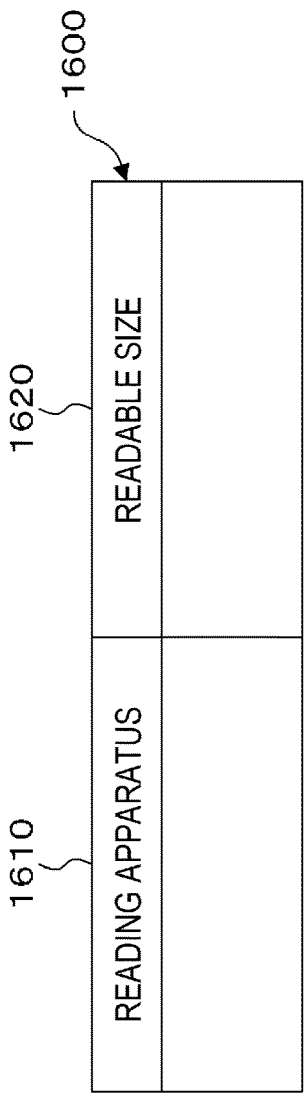
FIG. 16 is an explanatory view illustrating a data structure example of a reading apparatus/readable size correspondence table.

In step S420, a readable size of the reading apparatus B 195 is extracted. For example, the reading apparatus/readable size correspondence table 1600 is used. FIG. 16 is an explanatory view illustrating a data structure example of the reading apparatus/readable size correspondence table 1600. The reading apparatus/readable size correspondence table 1600 includes a reading apparatus column 1610 and a readable size column 1620. The reading apparatus column 1610 stores model information of a reading apparatus (which may be information allowing the reading apparatus to be uniquely identified). The readable size column 1620 stores a readable size in the reading apparatus. The model information of the reading apparatus B 195 (the image processing apparatus 610) connected to the document size detecting apparatus 100 may be searched for in the reading apparatus column 1610, and the information within the readable size column 1620 may be extracted.

In step S422, the procedure generation module 135 performs a reading procedure generation process. That is, a reading procedure is determined according to a document size and a readable size.

For example, the arrangement relationship between a reading surface and a document is determined such that the width or the height of the reading surface (the readable size) is longer than or equal to or longer than the width or the height of the document size. For example, as illustrated in FIG. 17A, in the size relationship between the reading surface 620 (the readable size) and the document 1700, the arrangement is made such that the height of the reading surface 620 is longer than the height of the document 1700. That is, when one side of the reading surface 620 is longer than one side of the document 1700, the arrangement is made such that the whole of one side of the document 1700 may be read at a time. This makes it possible to perform reading only by moving the document 1700 in one direction (a direction intersecting one side at right angles, that is, the lateral direction in the example of FIGS. 17A and 17B). That is, the document 1700 does not need to move in the direction along one side (that is, the longitudinal direction in the example of FIGS. 17A and 17B).

As illustrated in the example of FIG. 17B, second and subsequent readings are repeated by moving the document 1700 in the lateral direction until the whole of the document 1700 is read. The number of times of reading may be calculated by the ratio of the length in the moving direction. In the example of FIGS. 17A and 17B, the width of the document 1700 may be divided by the width of the reading surface 620. Meanwhile, the number of times of reading is adjusted such that an overlapping range (overlap) occurs. The number of times is presented to the operator. After the reading is completed, an instruction as to whether further reading is required may be presented.

As illustrated in the example of FIG. 18A, in the size relationship between the reading surface 620 (the readable size) and the document 1800, the arrangement is made such that the width of the reading surface 620 is longer than the width of the document 1800.

As illustrated in the example of FIGS. 18B and 18C, second and subsequent readings are repeated by moving the document 1800 in the longitudinal direction until the whole of the document 1800 is read. The number of times of reading may be calculated by the ratio of the length in the moving direction. In the example of FIGS. 18A to 18C, the height of the document 1800 may be divided by the height of the reading surface 620. Meanwhile, the number of times of reading is adjusted such that an overlapping range occurs. The number of times is presented to the operator. After the reading is completed, an instruction as to whether further reading is required may be presented.

In the second and subsequent readings, the arrangement is determined such that an overlapping range occurs. The overlapping range serves a role as a joint when a synthesis process is performed.

In the case where three or more readings are required, the entire image captured by the reading apparatus A 190 is presented such that the operator may grasp a reading range each time, and the corresponding range may be specified using a frame or the like. Since an image is used, the reading range at the time of each reading may be easily grasped. Since the image itself is used, the image serves as an instruction as to which area on the document is to be read by the reading apparatus B 195 and also serves as an instruction as to at which position or in which orientation the document is to be placed on the reading apparatus B 195.

In step S424, the procedure presentation module 140 presents the reading procedure to the operator. Then, the operator performs a scanning operation by the reading apparatus B 195 according to the presented reading procedure so that plural readings are performed, and a synthesized image is generated.

Figure 19:
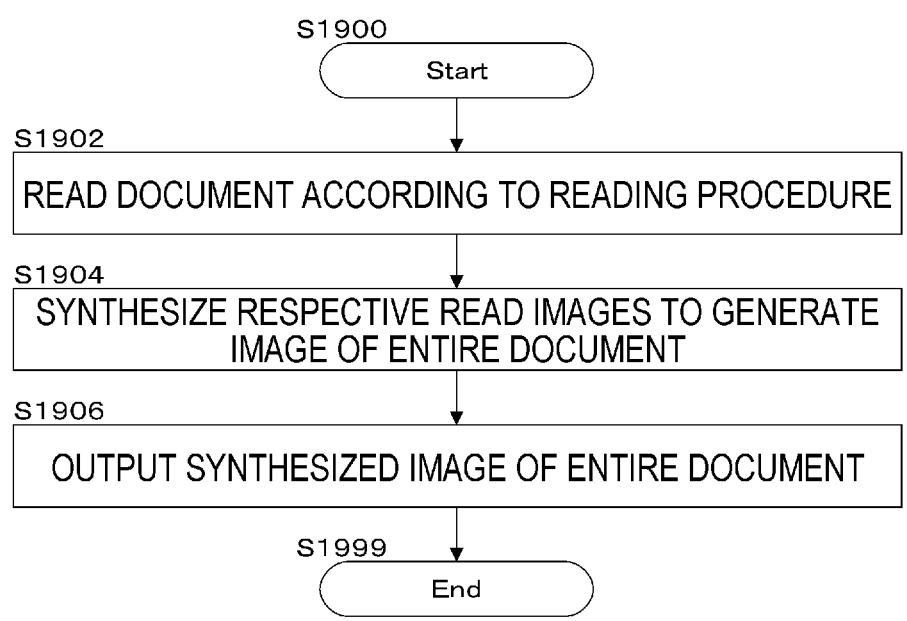
FIG. 19 is a flow chart illustrating a process example according to the exemplary embodiment.

FIG. 19 is a flow chart illustrating a process example according to the exemplary embodiment. Illustrated is a process example, in which an image is synthesized and output after the process according to the flow chart illustrated in the example of FIG. 4 is performed.

In step S1902, the reading apparatus B 195 reads the document according to the reading procedure. Plural readings are performed.

In step S1904, the synthesis apparatus 210 synthesizes respective read images to generate an image of the entire document.

In step S1906, the synthesis apparatus 210 outputs the synthesized image of the entire document.

Figure 20:
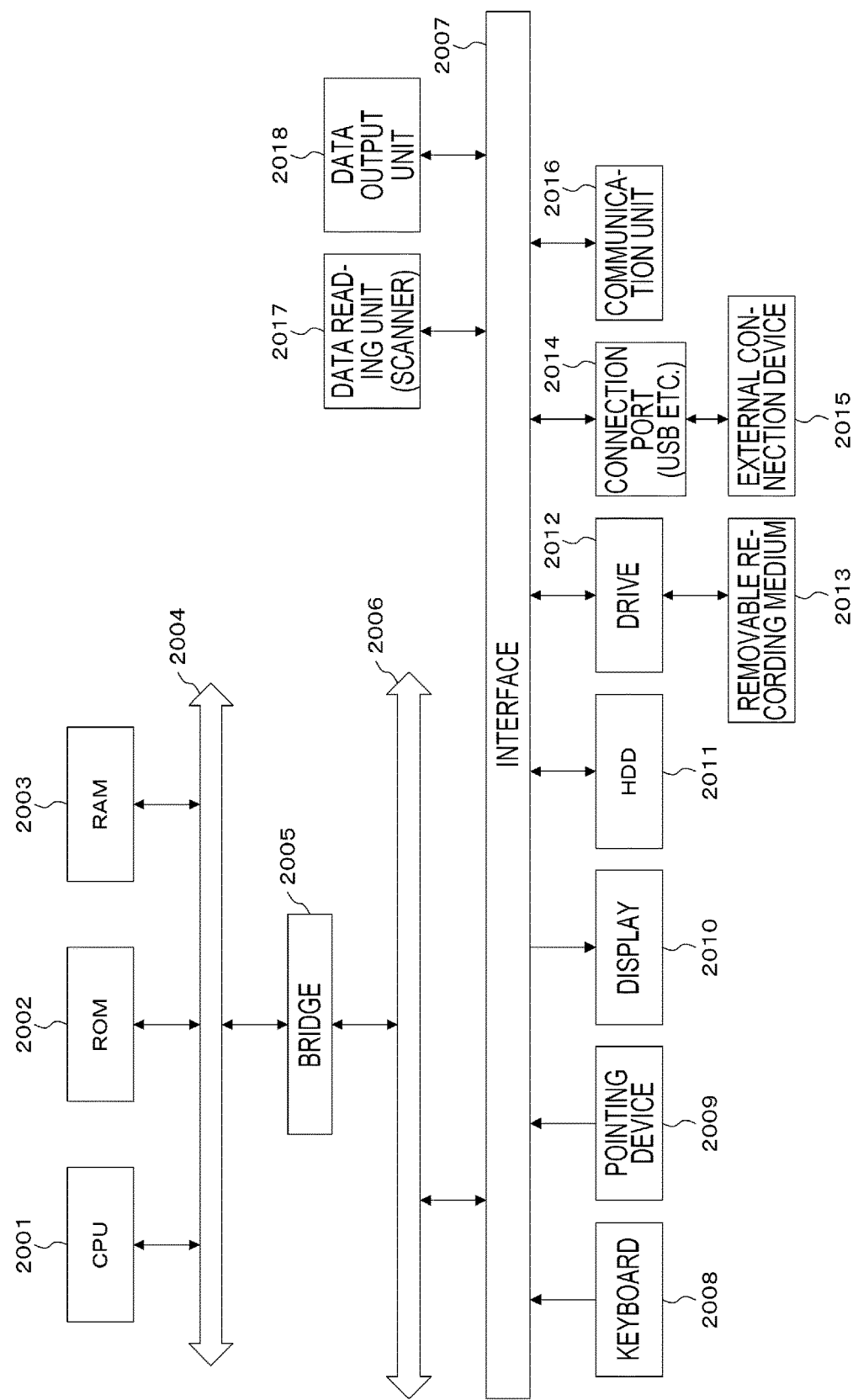
FIG. 20 is a block diagram illustrating a hardware configuration example of a computer that realizes the exemplary embodiment.

Descriptions will be made on a hardware configuration example of the document size detecting apparatus 100 (which may include the portable information processing apparatus 200, the image processing apparatus 205, and the like) according to the exemplary embodiment with reference to FIG. 20. The configuration illustrated in FIG. 20 implemented by, for example, a personal computer (PC) or the like. FIG. 20 also illustrates a hardware configuration example including a data reading unit 2017 such as a scanner, and a data output unit 2018 such as a printer.

A central processing unit (CPU) 2001 is a controller that executes a process according to a computer program that describes an execution sequence of each of various modules described in the above described exemplary embodiment, that is, the image acquisition A module 105, the image acquisition B module 110, the guidance module 115, the matching process module 120, the document size detecting module 125, the read size/readable size extraction module 130, the procedure generation module 135, the procedure presentation module 140, and the like.

A read only memory (ROM) 2002 stores programs, operation parameters, and the like used by the CPU 2001. A random access memory (RAM) 2003 stores programs used in the execution of the CPU 2001, parameters that properly vary in the execution, and the like. These are connected to each other via a host bus 2004 configured with a CPU bus or the like.

The host bus 2004 is connected to an external bus 2006 such as a peripheral component interconnect/interface (PCI) bus via a bridge 2005.

A keyboard 2008, and a pointing device 2009 such as a mouse are devices operated by an operator. A display 2010 may be a liquid crystal display device, a cathode ray tube (CRT), or the like, and displays various information as text or image information. The display 2010 may be a touch screen or the like which has both functions of the pointing device 2009 and the display 2010. In such a case, in the implementation of a keyboard function, unlike the physically connected keyboard 2008, a keyboard may be drawn on a screen (a touch screen) by software (referred to as a so-called software keyboard, a screen keyboard, or the like) so as to implement the keyboard function.

A hard disk drive (HDD) 2011 incorporates a hard disk (that may be a flash memory or the like), and drives the hard disk to write or reproduce programs or information to be executed by the CPU 2001. The hard disk stores an image read by the reading apparatus A 190 or the reading apparatus B 195, the camera image size table 800, the scan image size table 900, the reading apparatus/readable size correspondence table 1600, and the like. Further, the hard disk stores other various data, various computer programs and the like.

A drive 2012 reads data or programs recorded in a removable recording medium 2013 such as a magnetic disk, an optical disc, a magneto-optical disc, or a semiconductor memory, which is mounted thereto, and provides the data or programs to the RAM 2003 connected via an interface 2007, the external bus 2006, the bridge 2005, and the host bus 2004. The removable recording medium 2013 may also be usable as a data recording area.

A connection port 2014 is a port to which an external connection device 2015 is connected, and includes a connection unit such as a USB, IEEE 1394, or the like. The connection port 2014 is connected to the CPU 2001, etc. via the interface 2007, the external bus 2006, the bridge 2005, the host bus 2004, and the like. A communication unit 2016 is connected to a communication line, and executes a process of a data communication with the outside. The data reading unit 2017 is, for example, a scanner, and executes a reading process of a document. The data output unit 2018 is, for example, a printer, and executes an output process of document data.

The hardware configuration of the document size detecting apparatus 100 illustrated in FIG. 20 is merely one configuration example, but the exemplary embodiment is not limited to the configuration illustrated in FIG. 20 as long as a configuration where modules described in the exemplary embodiment are executable is employed. For example, some modules may be implemented by dedicated hardware (e.g., an application specific integrated circuit (ASIC) or the like), and some modules may be provided in the external system connected through a communication line. Further, plural systems illustrated in FIG. 20 may be connected to each other through a communication line to cooperate with each other. Particularly, the configuration may be incorporated into a portable information communication device (including a mobile phone, a smartphone, a mobile device, a wearable computer, or the like), information appliances, a robot, a copier, a facsimile, a scanner, a printer, a multifunction device (an image processing apparatus having at least two functions of a scanner, a printer, a copier, a facsimile, and the like) or the like, as well as the personal computer.

The above described program may be provided while being stored in a recording medium, or may be provided via a communication unit. In such a case, for example, the above described program may be regarded as an invention of "a computer-readable recording medium having a program written therein."

The "computer-readable recording medium having a program written therein" refers to a computer-readable recording medium having a program written therein, which is used for installing, executing, and distributing the program.

Examples of the writing medium may include a digital versatile disc (DVD), e.g., "DVD-R, DVD-RW, DVD-RAM etc." which are standards formulated in a DVD forum, and e.g., "DVD+R, DVD+RW etc." which are standards formulated in DVD+RW, a compact disc (CD), e.g., a read-only memory (CD-ROM), a CD recordable (CD-R), a CD rewritable (CD-RW) etc., a Blu-ray (registered mark) disc, a magneto-optical disc (MO), a flexible disc (FD), a magnetic tape, a hard disk, a read only memory (ROM), an electrically erasable programmable read only memory (EEPROM (registered mark)), a flash memory, a random access memory (RAM), a secure digital (SD) memory card and the like.

The whole or a part of the above described program may be stored or distributed while being written on the above described recording medium. Also, the program may be transmitted through a communication, for example, using a wired network or a wireless communication network used for a local area network (LAN), a metropolitan area network (MAN), a wide area network (WAN), the Internet, an intranet, an extranet and the like, or using a transmission medium having a combination of these. Also, the program may be carried on a carrier wave.

Further, the above described program may be a part or the whole of another program, or may be written on a recording medium together with a separate program. Also, the program may be divided and written on plural recording media. In addition, the program may be recorded in any other manner such as compression or encryption as long as it can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document size detecting apparatus comprising:
   a processor configured to function as:
      a first acquisition unit that acquires a first image that is an image of an entire document as a reading target; and
      a second acquisition unit that acquires a second image that is an image of a part of the document read by a first reading apparatus; and
   a detector that detects a size of the document using a result of a matching process between the first image and the second image and a read size that is a size of the second image read by the first reading apparatus.

2. The document size detecting apparatus according to claim 1, wherein the processor is further configured to function as:
   a guidance unit that provides an operator guidance about a reading procedure when the document is read by the first reading apparatus in a plurality of batches, using the size of the document and the read size.

3. The document size detecting apparatus according to claim 2, wherein the reading procedure includes an instruction as to which area on the document is to be read by the first reading apparatus at each reading.

4. The document size detecting apparatus according to claim 2, wherein the reading procedure includes an instruction as to at which position or in which orientation the document is to be placed on the first reading apparatus in each reading.

5. The document size detecting apparatus according to claim 2, wherein the reading procedure includes an instruction on the number of times the document is to be read.

6. The document size detecting apparatus according to claim 2, wherein the reading procedure includes an instruction as to whether further reading is required after reading at least once is completed.

7. The document size detecting apparatus according to claim 2, wherein the first acquisition unit acquires a result of reading an entire area of the document using a second reading apparatus that is different from the first reading apparatus and that has a reading accuracy lower than that of the first reading apparatus.

8. The document size detecting apparatus according to claim 1, wherein the detector calculates a ratio of an area occupied by an image corresponding to the second image in the first image from the result of the matching process.

9. The document size detecting apparatus according to claim 8, wherein the detector detects the size of the document using the ratio and the read size.

10. The document size detecting apparatus according to claim 9, wherein the detector calculates a width ratio and a height ratio of the area occupied by the image corresponding to the second image in the first image from the result of the matching process.

11. The document size detecting apparatus according to claim 10, wherein the detector detects a width and a height of the document using the width ratio, the height ratio, and the read size.

12. The document size detecting apparatus according to claim 2, wherein the guidance unit determines the reading procedure according to the size of the document and a readable size of the second acquisition unit.

13. The document size detecting apparatus according to claim 12, wherein the guidance unit determines the reading procedure such that a width or a height of the readable size is longer than or equal to or longer than a width or a height of the size of the document.

14. The document size detecting apparatus according to claim 12, wherein the guidance unit determines the reading procedure such that when an adjacent area is read, an area of the document is read together.

15. A non-transitory computer readable storage medium storing a program that causes a computer to execute a document size detection process, the process comprising:
   acquiring a first image that is an image of an entire document as a reading target;
   acquiring a second image that is an image of a part of the document read by a first reading apparatus; and
   detecting a size of the document using a result of a matching process between the first image and the second image and a read size that is a size of the second image read by the first reading apparatus.

16. An image processing system comprising:
   a document size detecting apparatus;
   a first reading apparatus; and
   an image synthesis apparatus, wherein
   the document size detecting apparatus includes
      a processor configured to function as:
         a first acquisition unit that acquires a first image that is an image of an entire document as a reading target, and a second acquisition unit that acquires a second image that is an image of a part of the document read by the first reading apparatus, and a detector that detects a size of the document using a result of a matching process between the first image and the second image and a read size that is a size of the second image read by the first reading apparatus, the first reading apparatus includes a reader that reads the document, and the image synthesis apparatus includes a synthesizer that synthesizes a plurality of images read by the first reading apparatus.

17. The image processing system according to claim 16, wherein the first reading apparatus includes the document size detecting apparatus.

18. The image processing system according to claim 16, wherein the first reading apparatus includes the image synthesis apparatus.

19. The image processing system according to claim 16, wherein the first reading apparatus includes the image synthesis apparatus and the document size detecting apparatus.

* * * * *